United States Patent [19]

Kaufman et al.

[11] B 3,981,947

[45] Sept. 21, 1976

[54] METHOD FOR RECLAIMING WATERLOGGED PLASTIC INSULATED CONDUCTOR CABLE

[75] Inventors: Stanley Kaufman, Flanders; Raffaele Antonio Sabia, Lincroft, both of N.J.

[73] Assignee: Bell Telephone Laboratories, Incorporated, Murray Hill, N.J.

[22] Filed: Nov. 22, 1972

[21] Appl. No.: 308,659

[44] Published under the second Trial Voluntary Protest Program on January 27, 1976 as document No. B 308,659.

Related U.S. Application Data

[62] Division of Ser. No. 208,420, Dec. 15, 1971, Pat. No. 3,733,426.

[52] U.S. Cl. .............................. 264/36; 260/18 TN; 260/29.2 TN; 260/77.5 TB; 264/262; 264/272
[51] Int. Cl.² ..................... H01B 11/02; H01B 3/30
[58] Field of Search..................... 264/36, 262, 272; 174/23 R, 23 C; 260/18 TN, 29.2 TN, 77.5 TB; 61/36 R

[56] References Cited

UNITED STATES PATENTS

| 2,889,883 | 6/1959 | Santora | 61/36 R |
|---|---|---|---|
| 3,248,472 | 4/1966 | Montesano | 264/272 X |
| 3,427,393 | 2/1969 | Masterson | 264/45 X |

OTHER PUBLICATIONS

"Removing Water From Buried PIC Cable" from Bell Labratories Record, Sept. 1961, pp. 324–326.

*Primary Examiner*—Robert F. White
*Assistant Examiner*—Thomas P. Pavelko
*Attorney, Agent, or Firm*—C. E. Graves

[57] ABSTRACT

In-service PIC telephone cable that has become waterlogged in places is reclaimed dielectrically by pumping in an aromatic solvent oil containing cross-linking agents that will gel the oil in a predetermined period preferably of the order 24 hours. A nongelling prepurgent miscible with both water and aromatic solvent oil may be pumped in before the gelling compound is introduced, to more completely purge the water.

4 Claims, No Drawings

METHOD FOR RECLAIMING WATERLOGGED PLASTIC INSULATED CONDUCTOR CABLE

This is a division, of application Ser. No. 208,420 filed Dec. 15, 1971, now U.S. Pat. No. 3,733,426 issued May 15, 1973.

1. Field of the Invention

This invention relates broadly to the purging of water from in-service conduitlike structures; and more particularly concerns reclaiming the dielectric properties of water-logged plastic insulated multipair telephone cable.

2. Background of the Invention

Air core plastic insulated conductor (PIC) telephone cable occasionally becomes water-logged in service. The water creates leakage paths to wires with defective insulation. The signaling and transmission characteristics of telephone pairs with such lowered insulation resistance and high relative permittivity are severely degraded. Restoring insulation resistance to standards, particularly for buried plastic insulated cable, has been costly, temporary, and oftentimes not possible with present reclamation procedures.

One current method of removing water from plastic cables is to use acetone. This procedure removes the water but does not prevent its reentry. Accordingly, a principal object of this invention is to remove water already present in a multipair plastic insulated telephone cable, and prevent its reentry through existing cable sheath faults or such faults that may develop in the future by filling the cable interstices.

In realizing an effective cable purging and filling compound, however, many further requirements must be met. aluminum, For example, the compound must be compatible with the wire insulation, with the cable jacket, with the shield which is typically aluminum and with other materials present in buried closures.

The compound must maintain the separation of the conductors snd the integrity of the sheath including, the polyethylene jacket and aluminum shield.

The compound must not corrode the aluminum or copper conductors when contact is made with them through the pinholes normally found in their plastic insulation.

Further, the compound must have high insulation resistance and volume resistivity, low dielectric constant, and exhibit low dielectric losses, so as to restore the insulation resistance, capacitance and dielectric losses of the cable to acceptable values.

To prevent reentry of water into the cable, the compound must be hydrophobic and fairly permanent.

Importantly, the compound must have an initial low viscosity to permit pumping through substantial lengths of cable preferably during a normal workday.

Important further properties are long shelf life, low price, and safety in handling.

Accordingly the principal object of the invention is to permanently rid telephone cables of water that has seeped in and restore dielectric properties to acceptable levels.

A further inventive object is to prevent the reentry of water in a PIC telephone cable with the very compound used to purge.

A further inventive object is to devise a water purging compound for telephone PIC cable with acceptably low initial viscosities, but which cures to a soft tacky compound that wets the wire insulation.

A still further inventive object is to purge water in telephone plastic cables with a single pumping over as long a cable stretch as possible.

SUMMARY OF THE INVENTION

In its broadest aspect, this invention contemplates the use of a hydrophobic insulating material that displaces the water in a waterlogged cable as the material is pumped in, and once in place, cures to a high viscosity that precludes its escaping through lightning pinholes or other sheath defects, while at the same time precluding the reentry of water.

In general, several classes of insulating materials that are initially of sufficiently low viscosity to permit pumping into a telephone cable, and which retain the low viscosity for a long enough time to permit extended pumping, are contemplated within the inventive scope. These are: thixotropic compounds; gelling compounds; cross-linking compounds and combination thereof.

A particular embodiment of the invention is a cross-linking material which is basically a solution of a room temperature curing liquid urethane elastomer in a low viscosity oil. The material is pumped into the cable at a very low viscosity and purges the water. Then, after a period dependent on the amount of catalyst used the urethane cross-links, forming a three-dimensional network which gels the oil. The result is a filled cable purged of water and henceforth waterproofed.

In a specific inventive embodiment a viable method has been found for obtaining a sufficiently low viscosity reactive material that achieves all of the inventive objects including the pumpability of the compound and its later setting up into a soft tacky material. A more specific illustration is a solution of a hydroxyl terminated polybutadiene and a castor oil based isocyanate prepolymer in a low viscosity aromatic oil.

Pursuant to a further aspect of the invention, it has been realized that a "prepurgant" that is highly miscible with both water and with the main purgant serves to remove an even greater percentage of water than does use of the main gelling purgant along. For example, prepurging with liquid polypropylene glycol which is completely miscible in water and wets polyethylene removes the water; and purging the polypropylene glycol in turn with the last-stated solution routinely restores a very high percentage of bad pairs to acceptable values of insulation resistance.

Pursuant to the invention, initial viscosity of the solution to be introduced in the cable is critical to purging and thereafter filling long cable lengths.

An empirical equation for the viscosity of a solution of two liquids, as for example, an oil and a liquid polymer, is given by:

$$\log \eta_c = (1-A_p) \log \eta_0 + A_p \log \eta_p \qquad (1)$$

where $\eta_c$ is the viscosity of the composite solution;
$N_o$ and $\eta_p$ are the viscosities of the oil and the liquid polymer respectively;
$A_p$ is the percentage of polymer in the solution.

From the above equation, it is evident that the viscosity of the solvent and the polymer must be minimized; but moreover, the percentage of polymer in the composition must also be minimized.

Additionally, the polymer must be chosen for its hydrophobic and low viscosity properties and for its ability to cure within temperature ranges encountered in practice.

The invention, its further object, features, and advantages will be illustrated in the text and examples to follow which describe illustrative embodiments thereof.

DESCRIPTION OF ILLUSTRATIVE Embodiments

A particular and presently preferred class of material pursuant to the present invention is a solvent oil gelled by cross-linked urethane network formed by reacting, on an essentially 1:1 basis, a material having an unblocked (i.e. available) hydroxyl functionality with a material having an unblocked isocyanate functionality. The invention more specifically contemplates systems within this preferred class which have an initial viscosity less than 100 CPS at all temperatures between 35°F. and 90°F. Still more specifically, systems as above are preferred which exhibit when fully gelled a dielectric constant of not more than 3.0, and preferably not more than 2.5.

A specific application of the present invention is a multipair sheathed plastic-insulated conductor telephone cable filled by a solvent gelled by a cross-linked urethane polymer composition containing 5 to 20 weight percent polymer. The cross-linked urethane polymer is formed from a polyol and an isocyanate prepolymer wherein the polyol is of the polyether, polyester, castor oil or polybutadiene type.

Example 1

The cable water purgant of this example will be described in terms of Part I and Part II because the components are advantageously stored in two such parts until just prior to introduction into the cable where they are mixed preferably in equal proportions of Part I and Part II. All ingredients could as well be combined at such time, however.

Part I consists of a castor oil based isocyanate prepolymer in an aromatic solvent oil, in the amounts 50 grams of isocyanate prepolymer per liter of solution. The prepolymer is formed from toluene diisocyanate and castor oil, and has a hydroxyl functionality of 2.8 and an equivalent weight of approximately 288. Castor oil for present purposes is defined as a mixture of about 70 percent pure glyceryl triricinoleate and 30 percent glyceryl diricinoleate-monooleate or monolinoleate. It is seen that from the standpoint of isocyanate utilization the castor oil is approximately 70 percent tri and 30 percent difunctional. The triol structure of castor oil produces cross-linking. The aromatic solvent oil is defined as an oil containing a major proportion of aromatic molecules, that is, molecules having at least one aromatic ring.

Part II consists of 100 gm/liter of solution (in aromatic solvent oil) of hydroxyl terminated polybutadiene having a hydroxyl functionality between 2.2 and 2.4 and a hydroxyl content between 0.75 and 0.90 equivalents per kilogram and 4 gm/liter dibutyl tin dilaurate catalyst.

Example 2

The water purgant of Example 2 is the same as that described in Example 1, except that the castor oil based isocyanate prepolymer is of the diphenylmethane diisocyanate type.

Example 3

The purgant of this example is the same as that of Example 1, except that the isocyanate prepolymer is one based on hydroxyl-terminated polybutadiene and toluene diisocyanate.

Example 4

The purgant of this example is the same as that of Example 1, except that the isocyanate prepolymer is one based on hydroxyl-terminated polybutadiene and diphenylmethane diisocyanate.

In Example 1, the grams per liter of castor oil based isocyanate prepolymer may be varied within a range of about 25 to 150. Aromatic solvent oil is selected in order to dissolve the polybutadiene and the castor oil prepolymer. The aromatic oil preferably consists of greater than 90 percent by weight of aromatic molecules as above defined, and as measured in accordance with ASTM D-2007.

The mixture consisting of Parts I and II as defined in the three above examples must exhibit an initial viscosity below 100 centipoise at all temperatures between 35° and 90°F. More specifically, the mentioned concentrations may be varied but not beyond that which would exceed the initial viscosity of 100 centipoise.

The concentrations of the mentioned ingredients of Part II may be reduced by about 20 percent, and the aromatic solvent oil will still be gelled.

A prepurgant selected pursuant to a further aspect of the invention has been found to be highly advantageous. In general, the prepurgant must be miscible with water and with the reclamation compound. It must also wet polyethylene. In Example 1 above, the reclamation compound is aromatic solvent oil; and as a prepurgant for this-applicants use, for example, polypropylene glycol of molecular weight in the range 425–150.

Liquid polyethylene glycol may also be used as a prepurgant. Ketones such as methyl ethyl ketone may be used with necessary safety precautions.

In the foregoing examples, the aromatic oil used is available for example from Kenrigh PetroChemicals under the name Kenplast G.

| Its main properties are: | |
|---|---|
| Specific gravity | 1.02 |
| Viscosity at 25° C. | 11 cps |
| Pour Point °F. | −40 |
| Mixed analine pt °F. | 60 |
| Flash point °F. | 290 |
| Hydrocarbon analysis, wt %: | (Clay-Gel Analysis) |
| Polar resins | 4 |
| Aromatics | 95 |
| Saturates | 1 |

The polyol used is a hydroxyl terminated liquid polybutadiene obtainable for example under the trade name Poly-bd from the ARCo Chemical Company. Its properties are:

| | |
|---|---|
| Polybutadiene isomer content | |
| Trans 1, 4 | 60% |
| Cis 1, 4 | 20% |
| Vinyl 1, 2 | 20% |
| Viscosity at 75°F. | 80 poise |
| Moisture wt % | 0.05 |
| Iodine Number | 398 |
| Hydroxyl Content | 0.85 equivalents/kgm |

The isocyanate used is obtainable under the name Vorite 128 from Baker Castor Oil Company. It is a castor oil based prepolymer. It was chosen because of its low vapor pressure (thus low toxicity by inhalation), and its solubility in aromatic oil. Some of its properties are listed below.

| Functionality | 2.8 |
|---|---|
| Equivalent wt | 388 |
| Specific gravity | 1.007 |
| Pour point | 35° F. |
| Viscosity at 25° C. | 215 poise |
| % NCO | 10.8 |

Further examples of materials which have the requisite hydroxyl functionality include: natural rubber into which hydroxyl funtionalities have been introduced; ethylene-propylene-rubber copolymers terpolymers into which hydroxyl functionalities have been introduced; and styrene-butadiene rubber (SBR) modified to contain hydroxyl functionalities.

In the foregoing examples, it was surprising that the gelling compound was found to gel even with water mixed in it despite the very small amount of urethane links. The significance of this observation is elucidated in the summary below.

In the development of cable reclamation material which resulted in the present invention, the reconciliation of several conflicting requirements was necessary: (1) the material must be pumpable into the cable (2) once in place in the cable, it must gel in a reaction that takes place even in the presence of residual water (3) the gel must be physically and chemically stable, i.e., it must not separate or bleed solvent and the gel structure must be stable to hydrolysis.

Requirement (1) can be fulfilled by using a low viscosity solvent or diluent, by minimizing the amount of gelling agent in the solution, and by also minimizing the viscosity of the gelling agent.

Requirement (2) must be considered in two parts. The minimum amount of gelling agent needed to gel the oil was not known a priori to be small enough to concurrently allow fulfillment of requirement (1). The additional requirement that the compound gel in the presence of water (which interferes with the urethane reaction) required the use of additional gelling agent over the minimal amount that would gel a dry (water free) oil. The compound will gel even with water mixed in it, and will encapsulate the water.

Requirement (3) also is in conflict with requirement (1). Since the material must not shrink due to volatilization of the solvent, a very low viscosity solvent (such as toluene) cannot be used. Safety considerations also require a material with low vapor pressure. An oil pursuant to the invention was used to obtain both volatility and viscosity characteristics.

The spirit of the invention is embraced in the scope of the claims to follow.

What is claimed is:

1. A method of purging water present in the interstices of multipair sheathed plastic-insulated conductor telephone cable and for thereafter sealing said cable against further entry of water, comprising the steps of:

pumping into said cable a nongelling purgant characterized by complete miscibility in the water present; and thereafter purging said nongelling purgant and included water therein by pumping into said cable a gelling purgant characterized by complete miscibility with said first purgant said gelling purgant characterized by an initial viscosity at the time of said pumping of less than 100 centipoises at any temperature between 35° and 90° Fahrenheit and a capability to gel in a predetermined period of the order of 24 hours after entering into said cable, and wherein said gelling purgant consists of an aromatic solvent oil containing greater than 90 weight percent aromatic molecules and equal amount by weight of a first and a second material, said first material consisting of from 25 to 150 grams of isocyanate prepolymer per liter of solution and said second material consisting of from 80 to 120 grams of hydroxyl-terminated polybutadiene per liter of solution and substantially 4 grams per liter of solution of dibutyl tin dilaurate.

2. The method pursuant to claim 1, wherein said nongelling purgant is polypropylene glycol having a molecular weight in the range 425–150.

3. The method of purging unwanted liquid comprising substantially water from the interior voids of a jacketed multipair plastic insulated conductor cable and for thereafter rendering said interior resistant to further entry of water, comprising the steps of creating a purging agent immiscible with said unwanted liquid from at least two liquid parts, one said part containing a polyisocyanate prepolymer and a second said part containing a hydroxyl terminated polybutadiene, the average functionality of said prepolymer and said hydroxyl terminated polybutadiene in urethane formation being sufficient to form a cross-linked urethane network, one of said parts further containing a catalyst which promotes urethane formation, at least one of said parts further containing an aromatic solvent oil in an amount constituting the major fraction by weight of the final said purging agent, said oil being present in a proportion such that, when said parts are mixed, the initial viscosity of the mixture does not exceed 100 centipoise at any temperature between 35° and 90° Farenheit;

pumping said purging agent while it still possesses its said initial viscosity, into said interior voids thereby diplacing said unwanted liquid;

removing said unwanted liquid at a point remote from the point of purging agent introduction; and discontinuing purging when said agent has filled the interior voids to be reclaimed.

4. The method pursuant to claim 3, wherein said aromatic solvent oil contains a major proportion of aromatic molecules; and when said polyisocyanate prepolymer is present in amounts of from 25 to 150 grams per liter of said first part and said hydroxyl terminated polybutadiene is present in amounts of from 80 to 120 grams per liter of said second part.

* * * * *